United States Patent
Gau et al.

(10) Patent No.: US 6,658,445 B1
(45) Date of Patent: Dec. 2, 2003

(54) APPARATUS AND METHOD FOR DEMODULATING A SQUARE ROOT OF THE SUM OF TWO SQUARES

(75) Inventors: Yow-Ling Gau, Taipei (TW); Bor-Chin Wang, Taoyuan (TW); Ching-Chun Meng, Taoyuan (TW)

(73) Assignee: Chun-Shan Institute of Science and Technology, Taoyuan (TW)

( * ) Notice: Subject to any disclaimer, the term of this patent is extended or adjusted under 35 U.S.C. 154(b) by 554 days.

(21) Appl. No.: 09/614,116

(22) Filed: Jul. 11, 2000

(51) Int. Cl.$^7$ ................................................ G06F 7/38
(52) U.S. Cl. .................................................... 708/605
(58) Field of Search ................................... 708/605–606

(56) References Cited

U.S. PATENT DOCUMENTS

| | | | | |
|---|---|---|---|---|
| 3,829,671 A | * | 8/1974 | Gathright et al. ........... | 708/605 |
| 4,553,260 A | * | 11/1985 | Belt et al. .................... | 708/605 |
| 4,599,701 A | * | 7/1986 | Vojir et al. .................. | 708/605 |
| 4,694,417 A | * | 9/1987 | Cantwell ...................... | 708/605 |
| 4,736,334 A | * | 4/1988 | Mehrgardt ................... | 708/605 |
| 4,747,067 A | * | 5/1988 | Jagodnik, Jr. et al. ...... | 708/605 |
| 5,459,683 A | * | 10/1995 | Uesugi et al. ............... | 708/605 |
| 5,603,112 A | * | 2/1997 | Gabato et al. .............. | 708/605 |
| 5,862,068 A | * | 1/1999 | Onodera ...................... | 708/605 |
| 6,070,181 A | * | 5/2000 | Yeh .............................. | 708/605 |

* cited by examiner

Primary Examiner—Tan V. Mai
(74) Attorney, Agent, or Firm—Burns, Doane, Swecker & Mathis, L.L.P.

(57) ABSTRACT

An apparatus and method for demodulating a square root of the sum of squares of two inputs I and Q in a digital signal processing are provided. The square root $\sqrt{I^2+Q^2}$ is approximated by an equation $aX+bY$, wherein coefficients a and b are special binary numbers. Due to the numbers, the square root $\sqrt{I^2+Q^2}$ can be quickly computed by the operation of shifting and addition. A plurality of possible approximation values for the coefficients a and b are provided, as well as the use of a comparator to select the maximal one among the possible approximation values.

5 Claims, 3 Drawing Sheets

APPARATUS AND METHOD FOR DEMODULATING A SQUARE ROOT OF THE SUM OF TWO SQUARES

BACKGROUND OF THE INVENTION

1. Field of the Invention

The present invention relates to an apparatus and method for demodulating a square root of the sum of two squares, especially to an apparatus and method for demodulating a square root of the sum of two squares using the characteristic of a binary number to reduce the hardware cost and time consumption.

2. Description of Related Art

In the field of signal processing, to demodulate a square root $\sqrt{I^2+Q^2}$ of the sum of two squares of inputs I and Q is a common question. If we want to achieve an exact result of the square root, a lot of hardware cost and time will be wasted. Therefore, the researchers in the industry try to find out an approximation with an acceptable distortion to reduce the hardware cost and time consumption. A prior art is disclosed in the specification of a U.S. Patent whose application Ser. No. is 09/049,605, now U.S. Pat. No. 6,070,181, and whose title is "METHOD AND CIRCUIT FOR ENVELOPE DETECTION USING A PEEL CONE APPROXIMATION." The prior art approximates the square root $\sqrt{I^2+Q^2}$ with the value of an equation aX+bY, wherein X=|I|, Y=|Q|. The prior art firstly adopt a section-division method to divide a rectangular coordinate between 0 degree to 45 degree into a plurality of regions, and then uses a ROM to store coefficients a and b corresponding to the plurality regions. The ratio of X to Y is used to determine in which region the square root $\sqrt{I^2+Q^2}$ is located, and therefore uses a look-up table to capture the coefficients a and b corresponding to the located region. Finally, a multiplier/adder is used to calculate the result of the equation aX+bY to approximate the square root $\sqrt{I^2+Q^2}$. When computing the square-root approximation, the prior art uses a ROM and a multiplier/adder, and therefore creates the drawbacks of large hardware cost and time consumption.

SUMMARY OF THE INVENTION

Accordingly, an object of the present invention is to resolve the drawbacks of large hardware cost and time consumption in the prior art. In order to accomplish the object, the present invention proposes an apparatus and method for demodulating a square root of the sum of two squares. Like the prior art, the present invention approximates the square root $\sqrt{I^2+Q^2}$ of the sum of two squares of inputs I and Q with an equation aX+bY, wherein X=|I|, Y=|Q|. One of differences from the prior art is that the present invention proposes special coefficients a and b, which is suitable to compute the result of the equation $\sqrt{I^2+Q^2}$ rapidly with a special shifting characteristic of a binary number, and therefore eliminate the disadvantages of large hardware cost and time consumption due to the use of multipliers. Besides, the present invention creates a plurality of possible approximations simultaneously, and uses a comparator to select the maximal one among the possible approximations. The maximal one is the exact approximation of the square root $\sqrt{I^2+Q^2}$ of the sum of two squares of inputs I and Q. Depending on the characteristic, the present invention can eliminate the disadvantages of the prior art which uses a ROM to store a plurality of parameters.

The apparatus of the present invention mainly comprises an absolute value determining circuit, a maximal/minimal value determining circuit, a shifter/adder and a comparator. The absolute value determining circuit is used to obtain positive values of two inputs. The maximal/minimal value determining circuit is used to determine a maximal and minimal values of the positive values. The shifter/adder connected to the maximal/minimal value determining circuit is used to divide the ratio of A to B into k divisions, and the coefficients of every division are represented as a fraction whose denominator is a power of two, wherein k is a positive integer. By the characteristic that left shifting of a binary number represents multiplying the binary number by a power of two and that right shifting of a binary number represents dividing the binary number by a power of two, the values of the equation âA+b̂B of the first to the $$\frac{k}{2}-th$$

divisions are computed. The comparator is used to generate the maximal value of the $$\frac{k}{2}$$

outputs of the shifter/adder, and the largest value is the approximation of the square root of the sum of two squares.

The method of the present invention mainly comprises step (a) to step (d). In step (a), an equation âX+b̂Y is used to approximate a square root $\sqrt{I^2+Q^2}$ of the sum of two squares of inputs I and Q, wherein X=|I| and Y=|Q|. In step (b), the ratio of X to Y is divided into k divisions, and the values of â and b̂ of every division are represented as a fraction whose denominator is a power of two, wherein k is a positive value. In step (c), by the characteristic that left shifting of a binary number represents multiplying the binary number by a power of two and that the characteristic of right shifting of a binary number represents dividing the binary number by a power of two, the values of the equation âA +b̂B of the first to the $$\frac{k}{2}-th$$

divisions are computed, wherein A is the maximal value of X and Y, and B is the minimal value of X and Y. In step (d), the maximal value of the equation âA+b̂B of the k divisions is generated, and the maximal value is the approximation of the square root of the sum of two squares.

The present invention also can be implemented by software. Because the present invention has the advantages of simple structure and less operations, the implementation by software also has the advantages.

BRIEF DESCRIPTION OF THE DRAWINGS

The present invention will be described according to the appended drawings in which.

PREFERRED EMBODIMENT OF THE PRESENT INVENTION

Firstly, the present invention approximates the square root $\sqrt{I^2+Q^2}$ of the sum of two squares of inputs I and Q with an equation aX+bY, wherein X=|I|, Y=|Q|. One of the differences from the prior art is that the present invention does not use a look-up table to store coefficients a and b, but uses special coefficients a and b, which are suitable to compute the values of the equation $\sqrt{I^2+Q^2}$ rapidly with the special shifting characteristics of a binary number, and therefore eliminate the disadvantages of large hardware cost and time consumption due to the use of the multipliers.

Figure 1:
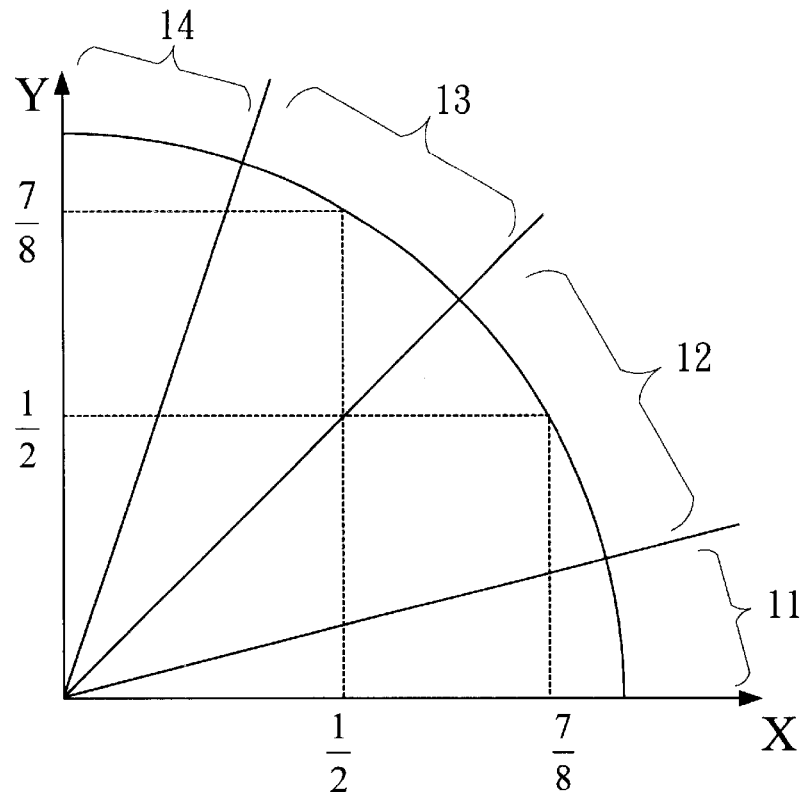
FIG. 1 is a schematic diagram of the 4-division approximation of the present invention.

FIG. 1 is a schematic diagram of the 4-division approximation of the present invention, which separates the range from 0 degree to 90 degree of a rectangular coordinate into four sections: a first section 11, a second section 12, a third section 13 and a fourth section 14. The two input values I and Q are treated respectively as the X axis and Y axis of the rectangular coordinate. The coefficients a and b corresponding to every point in the four sections are represented respectively as a fraction. For example, table 1 including coefficients a, b, an approximation â of the coefficient a and an approximation b̂ of the coefficient b when using the 4-division approximation. If the angle between a point coordinate (I,Q) and the original point is 30 degree, that coordinate is in the second section 12, and the exact values of coefficients a and b are then computed as 0.886 and 0.5. For generating the coefficients â and b̂, due to cooperating with the binary number in a digital system, the denominators of the coefficients â and b̂ are presented as a power of 2, such as 2, 4, 8, 16, 32, and so on. Therefore, the value 0.886 of the coefficient a and the value 0.5 of the coefficient b can be approximated respectively as $$\frac{7}{8} \text{ and } \frac{1}{2}.$$

Because the coefficients a and b corresponding to all points in the four sections are represented as the coefficients â and b̂, the maximal estimated error will not be over 3.4%. Finally, an equation âX+b̂Y=r̂ is used to approximate the square root $\sqrt{I^2+Q^2}$ of the sum of two squares of inputs I and Q. In other words, X is used to approximate the square root in the first section 11, $$\frac{7}{8}X + \frac{1}{2}Y$$

is used to approximate the square root in the second section 12, $$\frac{1}{2}X + \frac{7}{8}Y$$

is used to approximate the square root in the third section 13, and Y is used to approximate the square root in the fourth section 14.

TABLE 1

| Angle (degree) | a | â | b | b̂ | Maximal error |
|---|---|---|---|---|---|
| 0 | 1 | 1 | 0 | 0 | 3.4% |
| 30 | 0.886 | 7/8 | 0.5 | 1/2 | |
| 60 | 0.5 | 1/2 | 0.886 | 7/8 | |
| 90 | 0 | 0 | 1 | 1 | |

Figure 2:
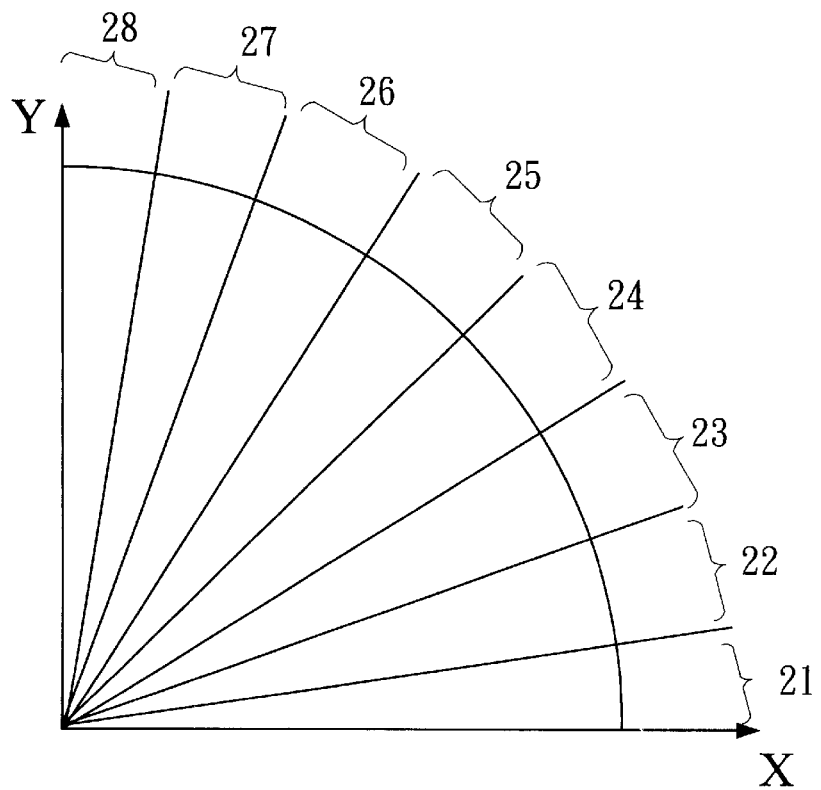
FIG. 2 is a schematic diagram of the 8-division approximation of the present invention.

FIG. 2 is a schematic diagram of the 8-division approximation of the present invention, which separates the range from 0 degree to 90 degree of a rectangular coordinate into eight sections: the first section 21, the second section 22, the third section 23, the fourth section 24, the fifth section 25, the sixth section 26, the seventh section 27 and the eighth section 28. Table 2 is a table including coefficients a, b, an approximation â of the coefficient a and an approximation b̂ of the coefficient b when using the 8-division approximation. If the angle between a point (I, Q) and the original point is 12.875 degree, that point is in the second section 22, and the exact values of the coefficients a and b are then computed as 0.9749 and 0.2225. For generating the coefficients â and b̂, due to cooperating with the binary numbers in a digital system as mentioned above, the denominators of the coefficients â and b̂ are represented by power of 2, such as 2, 4, 8, 16, 32, and so on. Therefore, the value 0.9749 of the coefficient a and the value 0.2225 of the coefficient b can be approximated respectively by $$\frac{31}{32} \text{ and } \frac{7}{32}.$$

Because the coefficients a and b corresponding to all points in the eight sections are represented by the coefficients â and b̂, the estimated error in the 8-division approximation is less than the estimated error in the 4-division approximation. After computed, the maximal estimated error in the 8-division method will not be over 0.8%. In other words, the present invention uses X to approximate the square root in the first section 21, $$\frac{31}{32}X + \frac{7}{32}Y$$

to approximate the square root in the second section 22, $$\frac{29}{32}X + \frac{7}{16}Y$$

to approximate the square root in the third section 23, $$\frac{25}{32}X + \frac{5}{8}Y$$

to approximate the square root in the fourth section 24, $$\frac{5}{8}X + \frac{25}{32}Y$$

to approximate the square root in the fifth section 25, $$\frac{7}{16}X + \frac{29}{32}Y$$

to approximate the square root in the sixth section 26, $$\frac{7}{32}X + \frac{31}{32}Y$$

to approximate the square root in the seventh section 27, Y to approximate the square root in the eighth section 28.

TABLE 2

| Angle (degree) | a | â | b | b̂ | Maximal error |
|---|---|---|---|---|---|
| 0 | 1 | 1 | 0 | 0 | 0.8% |
| 12.875 | 0.9749 | 31/32 | 0.2225 | 7/32 | |
| 25.714 | 0.9010 | 29/32 | 0.4339 | 7/16 | |
| 38.571 | 0.7818 | 25/32 | 0.6235 | 5/8 | |
| 51.428 | 0.6235 | 5/8 | 0.7818 | 25/32 | |
| 64.285 | 0.4339 | 7/16 | 0.9010 | 29/32 | |
| 77.142 | 0.2225 | 7/32 | 0.9749 | 31/32 | |
| 90 | 0 | 0 | 1 | 1 | |

Table 3 is a table including coefficients a, b, an approximation â of the coefficient a and an approximation b̂ of the coefficient b when using the 16-division approximation. If the angle between a point (I, Q) and the original point is 6 degree, the exact values of coefficients a and b are then computed as 0.9945 and 0.1045. For generating the coefficients â and b̂, due to cooperating with the binary numbers in a digital system as mentioned above, the denominators of the coefficients â and b̂ are represented by a power of 2, such as 2, 4, 8, 16, 32, and so on. Therefore, the value 0.9945 of the coefficient a and the value 0.1045 of the coefficient b can be approximated respectively by $$\frac{127}{128} \text{ and } \frac{7}{64}.$$

Because the coefficients a and b corresponding to all points in each of the sixteen section are represented as the coefficients â and b̂, the estimated error in the 16-division approximation is less than the estimated error in the 4-division approximation and 8-division approximation. After computed, the maximal estimated error in the 16-division approximation will not be over 0.4%.

TABLE 3

| Angle (degree) | a | â | b | b̂ | Maximal error |
|---|---|---|---|---|---|
| 0 | 1 | 1 | 0 | 0 | 0.4% |
| 6 | 0.9945 | 127/128 | 0.1045 | 7/64 | |
| 12 | 0.9781 | 125/128 | 0.2079 | 13/64 | |
| 18 | 0.9511 | 61/64 | 0.3090 | 5/16 | |
| 24 | 0.9135 | 117/128 | 0.4067 | 15/32 | |
| 30 | 0.8660 | 111/128 | 0.5 | 1/2 | |
| 36 | 0.8090 | 13/16 | 0.5878 | 75/128 | |
| 42 | 0.7431 | 95/128 | 0.6691 | 43/64 | |
| 48 | 0.6691 | 43/64 | 0.7431 | 95/128 | |
| 54 | 0.5878 | 75/128 | 0.8090 | 13/16 | |
| 60 | 0.5 | 1/2 | 0.8660 | 111/128 | |
| 66 | 0.4067 | 15/32 | 0.9135 | 117/128 | |

TABLE 3-continued

| Angle (degree) | a | â | b | b̂ | Maximal error |
|---|---|---|---|---|---|
| 72 | 0.3090 | 5/16 | 0.9511 | 61/64 | |
| 78 | 0.2079 | 13/64 | 0.9781 | 125/128 | |
| 84 | 0.1045 | 7/64 | 0.9945 | 127/128 | |
| 90 | 0 | 0 | 1 | 1 | |

The present invention can use the other number of sections, such as a 32-division approximation, a 64-division approximation, and so on, and the invention does not limit the section number. Besides, the coefficients â and b̂ in table 1 to table 3 are not unchangeable, as long as the values of the denominator of the coefficients â and b̂ are a power of two. For example, $$\frac{15}{32}$$

in table 3 can be replaced by $$\frac{29}{64}.$$

Figure 3:
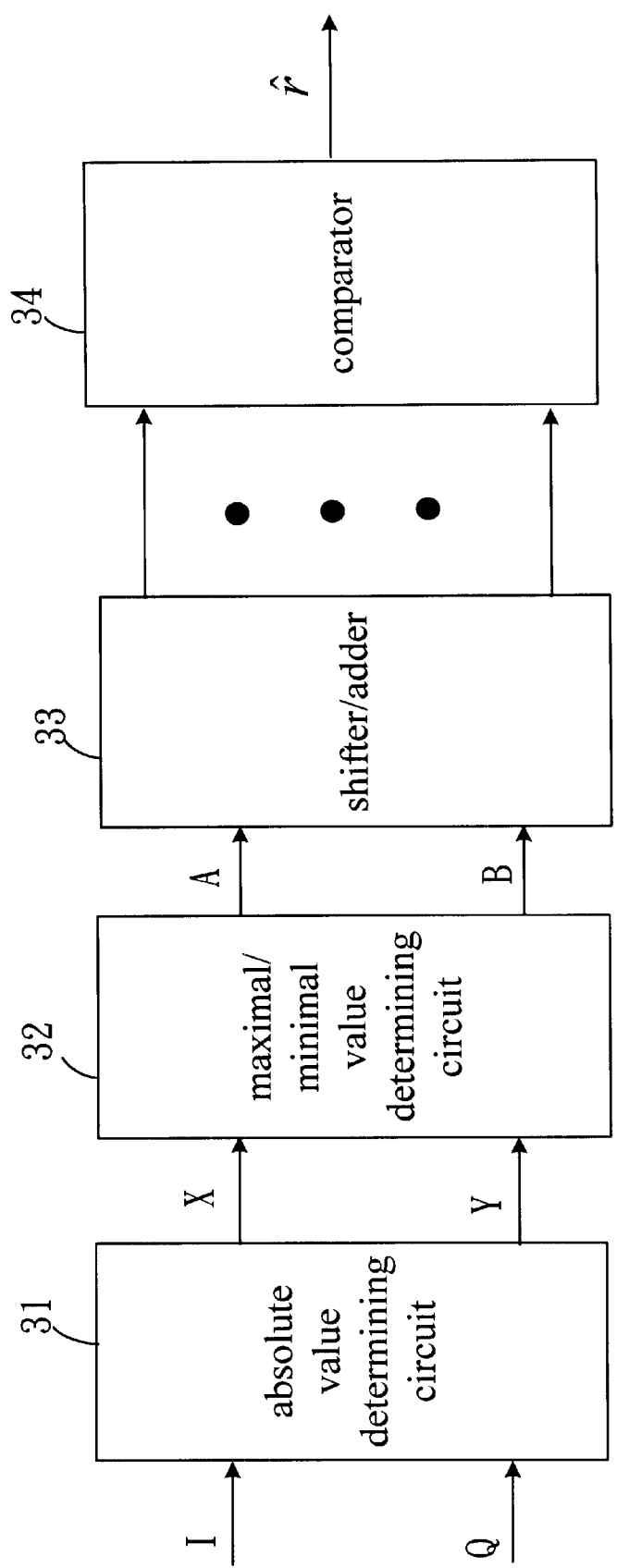
FIG. 3 is a structure diagram of an apparatus according to a first preferred embodiment of the present invention.

FIG. 3 is a structure diagram of an apparatus according to the first preferred embodiment of the present invention. The present invention comprises an absolute value determining circuit 31 and a maximal/minimal value determining circuit 32, a shifter/adder 33 and a comparator 34. The absolute value determining circuit 31 determines absolute values of two inputs I and Q and generates X and Y, wherein X=|I| and Y=|Q|. The maximal/minimal value determining circuit 32 is used to generate a maximal value A and minimal value B from X and Y. The values of â and b̂ in table 1 to table 3 have the property of lower-upper and left-right symmetry. For example, in table 3, the value of â with the angle of 6 degree is equal to the value of b̂ with the angle of 84 degree, and the value of â with the angle of 12 degree is equal to the value of b̂ with the angle of 78 degree. By using the absolute value determining circuit 31 and maximal/minimal value determining circuit 32, the present invention just needs to accomplish half content of table 1 to 3, and therefore one half of the hardware cost can be saved. The shifter/adder 33 is a technical characteristic of the present invention. According to the number of divisions, such as k divisions, and according to the values of â and b̂ in table 1 to table 3, the shifter/adder 33 computes the values of the equation âA+b̂B=r̂ of $$\frac{k}{2}$$

divisions. Due to the property of binary number in a digital system, the computation of âA and b̂B do not involve multiplication, but a simple operation of shift and addition. For example, in table 3, coefficients $$\hat{a} = \frac{127}{128} \text{ and } \hat{b} = \frac{7}{64}$$

are used to represent an equation $$\frac{127}{128}A + \frac{7}{64}B$$

and the equation can be expanded as $$\frac{(64A + 32A + 16A + 8A + 4A + 2A + A)}{128} + \frac{(4B + 2B + B)}{64}.$$

In a digital system, a binary number multiplied by a power t of two is to shift the binary number to the left for t bits, and a binary number divided by a power t of two is to shift the binary number to the right for t bits. According to the rule mentioned above, $$\frac{127}{128}A$$

is obtained by accumulating all A's by shifting left for 6 bits, 5 bits, 4 bits, 3 bits, 2 bits, 1 bit and 0 bit, and then the sum is shifted to the right for 7 bits to obtain the result after division by 128.

$$\frac{7}{64}B$$

is obtained by accumulating all B's by shifting to the left for 2 bits, 1 bit and 0 bit, and then the sum is shifted to the left for 6 bits to obtain the result after division by 64. The comparator 34 is used to select the maximal value of $$\frac{k}{2}$$

outputs of the shifter/adder 33 and the maximal value is the approximation $\hat{r}$ of the square root $\sqrt{I^2+Q^2}$ of the sum of two squares of inputs I and Q.

Figure 4:
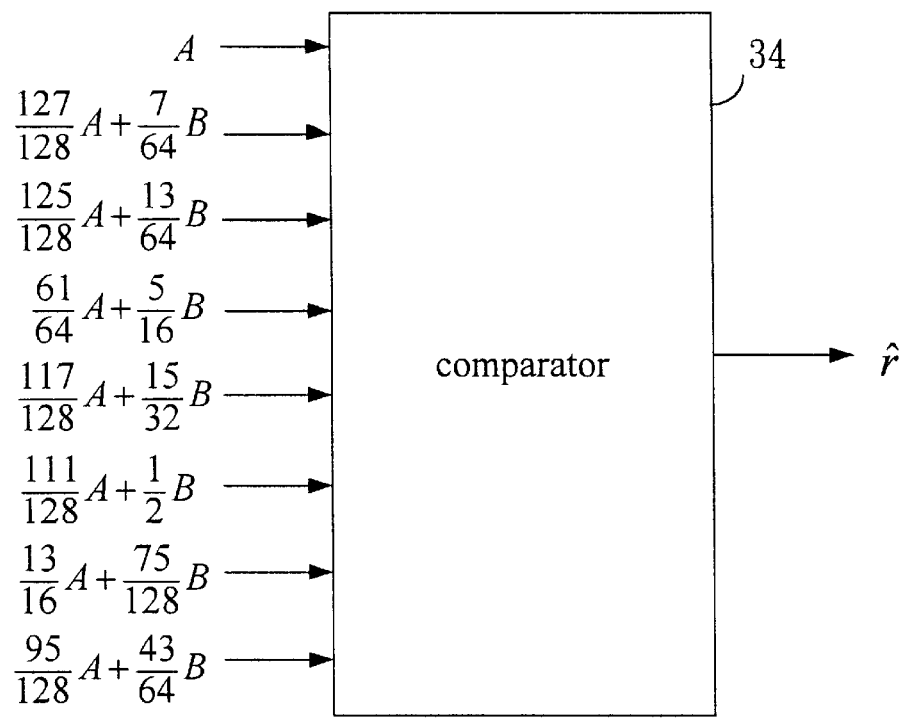
FIG. 4 is a schematic diagram of the comparators in FIG. 3.

FIG. 4 is a schematic diagram of the comparators in FIG. 3. The structure in FIG. 4 is used in a 16-division approximation, and therefore eight inputs are needed. The coefficients a and b of the eight inputs are shown in the entries of angles 0 to 42 in table 3.

Figure 5:
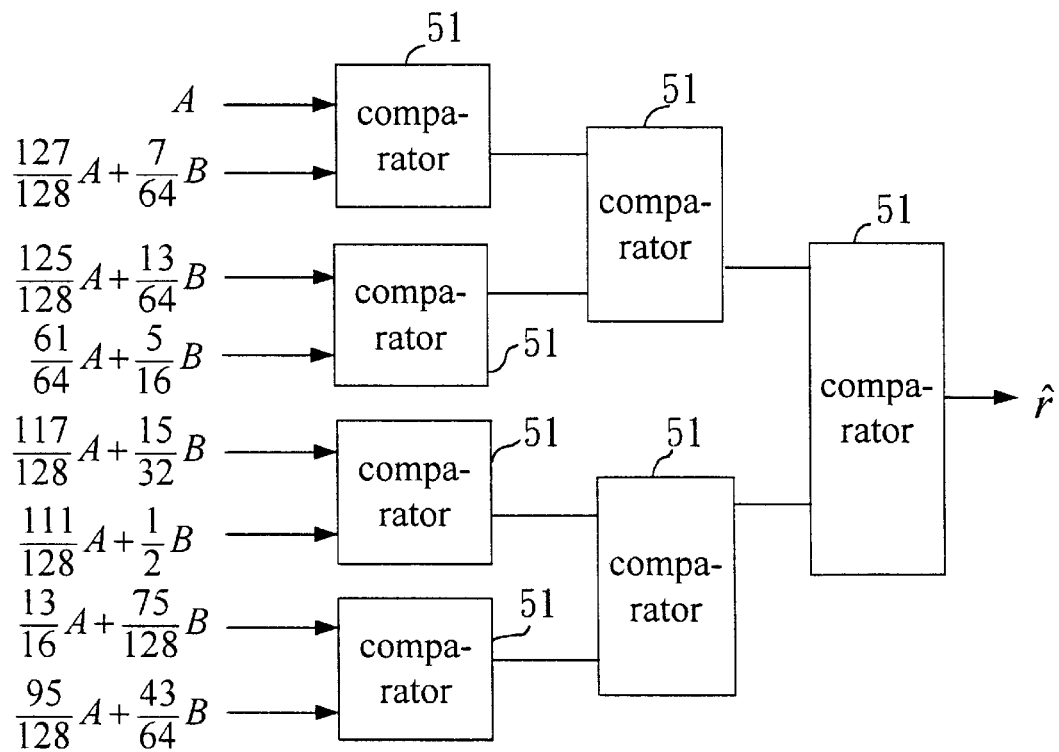
FIG. 5 is another schematic diagram of the comparators in FIG. 3.

FIG. 5 is a schematic diagram of the comparator in FIG. 3. In FIG. 4, a comparator 34 with $$\frac{k}{2}$$

inputs is used to deal with the $$\frac{k}{2}$$

outputs of the shifter/adder 33. In fact, a plurality of comparators 51 with less than $$\frac{k}{2}$$

inputs can be cascaded to form a topology of a tree structure as shown in FIG. 5 to replace the comparator 34 with $$\frac{k}{2}$$

inputs. The present invention is not limited to the topology.

The above-described embodiments of the present invention are intended to be illustrated only. Numerous alternative embodiments may be devised by those skilled in the art without departing from the scope of the following claims.

What is claimed is:

1. An apparatus for demodulating a square root of the sum of squares of two inputs I and Q in a digital signal processing, said apparatus calculating values of an equation $\hat{a}X+\hat{b}Y$ to approximate the value of a square root $\sqrt{I^2+Q^2}$, said apparatus comprising:

an absolute value determining circuit for obtaining positive values X and Y respectively from the inputs I and Q;

a maximal/minimal value determining circuit for determining a maximal value A and a minimal value B respectively corresponding to the outputs X and Y of said absolute value determining circuit;

a shifter/adder connected to said maximal/minimal value determining circuit for dividing the ratio of A to B into k divisions, values of $\hat{a}$ and $\hat{b}$ of every division being represented as a fraction whose denominator being a power of two; by shifting a binary number to the left to multiply the binary number by a power of two and shifting a binary number to the right to divide the binary number by a power of two, the values of the first to the $$\frac{k}{2}-th$$

divisions according to an equation $\hat{a}A+\hat{b}B$ being computed, wherein k is a positive value; and a comparator for generating a maximal value of the $$\frac{k}{2}$$

outputs of said shifter/adder, said maximal value is the approximation value of the square root $\sqrt{I^2+Q^2}$.

2. The apparatus of claim 1, wherein said comparator is formed by cascading a plurality of comparators whose input ports are less than $$\frac{k}{2}.$$

3. A method for demodulating a square root of the sum of two squares of two inputs I and Q in a digital signal processing, comprising the following steps:

(a) using an equation $\hat{a}X+\hat{b}Y$ to approximate the value of a square root $\sqrt{I^2+Q^2}$, wherein X=|I| and Y=|Q|;

(b) dividing the ratio of X to Y into k divisions, values of $\hat{a}$ and $\hat{b}$ of every division being represented as a fraction whose denominator being a power of two, wherein k is a positive value;

(c) by shifting a binary number to the left to multiply the binary number by a power of two and shifting a binary number to the tight to divide the binary number by a power of two, the values of the first to the k-th divisions according to said equation $âX+\hat{b}Y$ are computed; and (d) generating a maximal value among the values of the k divisions, said maximal value is the approximation value of the square root $\sqrt{I^2+Q^2}$.

4. The method of claim 3, wherein in step (b), the values of $â$ and $\hat{b}$ of the first to the $$\frac{k}{2}-th$$

divisions are equal to the values of $\hat{b}$ and $â$ of the k-th to $$\left(\frac{k}{2}+1\right)-th$$

divisions; by the property of symmetry, the values of the first to the $$\frac{k}{2}-th$$

divisions according to an equation $âA+\hat{b}B$ are computed only in step (c), wherein A is the maximal value between X and Y, and B is the minimal value between X and Y.

5. The method of claim 4, wherein in step (d), the maximal value among the values of the first to the $$\frac{k}{2}-th$$

divisions is selected as the approximation value of the square root $\sqrt{I^2+Q^2}$.

* * * * *